United States Patent [19]

Rossignol et al.

[11] Patent Number: 5,014,753

[45] Date of Patent: May 14, 1991

[54] RADIANT HEAT RESISTANT FLEXIBLE TUBE

[75] Inventors: Leopold Rossignol; Denis van Wassenhove, both of Crepy en Valois, France

[73] Assignee: Textilver SA, Crepy en Valois, France

[21] Appl. No.: 441,906

[22] Filed: Nov. 28, 1989

[30] Foreign Application Priority Data

Dec. 2, 1988 [GB] United Kingdom ............. 8828214.0

[51] Int. Cl.$^5$ ...................... F16L 59/08; F16L 59/14
[52] U.S. Cl. .................................. 138/149; 138/103; 138/104; 138/110; 138/125; 138/178; 428/36.4; 428/913; 428/920; 174/121 A
[58] Field of Search ............... 138/103, 104, 137, 125, 138/178, 110, 144, 149; 428/34.4, 34.5, 34.6, 34.7, 35.7, 35.8, 35.9, 36.1, 36.2, 36.4, 36.9, 36.91, 913, 920, 328; 174/121 R, 121 A

[56] References Cited

U.S. PATENT DOCUMENTS

| | | | |
|---|---|---|---|
| 2,099,126 | 11/1937 | Larsen | 138/104 |
| 2,181,035 | 11/1939 | White | 138/104 |
| 2,870,619 | 1/1959 | Greczin | 138/125 |
| 2,995,151 | 8/1961 | Lockwood | 138/125 |
| 3,018,800 | 1/1962 | Hanssens | 138/125 |
| 3,070,132 | 12/1962 | Sheridan | 138/103 |
| 3,166,688 | 1/1965 | Rowland et al. | 138/103 |
| 3,343,568 | 9/1967 | Branscum et al. | 138/104 |
| 3,554,237 | 1/1971 | Pelley et al. | 138/149 |
| 3,591,400 | 7/1971 | Palmquist et al. | 428/920 |
| 3,652,375 | 3/1972 | Johnson | 138/144 |
| 3,948,295 | 4/1976 | Lemont et al. | 138/149 |
| 4,275,268 | 6/1981 | Riggs et al. | 138/125 |
| 4,279,213 | 7/1981 | Urahama et al. | 138/103 |
| 4,455,246 | 6/1984 | Schmidt et al. | 428/920 |
| 4,486,480 | 12/1984 | Okumoto et al. | 428/36 |
| 4,501,790 | 2/1985 | Aizawa et al. | 428/328 |
| 4,533,591 | 8/1985 | Sorko-Ram | 428/328 |
| 4,581,285 | 4/1986 | Mahefkey | 428/920 |
| 4,582,734 | 4/1986 | Miller | 428/920 |
| 4,692,363 | 9/1987 | Reiss et al. | 138/149 |
| 4,755,313 | 7/1988 | Wahl et al. | 428/920 |
| 4,776,142 | 10/1988 | Hardesty | 428/328 |
| 4,900,611 | 2/1990 | Carroll | 428/328 |
| 4,919,995 | 4/1990 | Joly | 428/920 |
| 4,921,755 | 5/1990 | Carroll et al. | 428/328 |

FOREIGN PATENT DOCUMENTS 0300834 1/1989 European Pat. Off. .
2552508 5/1977 Fed. Rep. of Germany ...... 138/104

Primary Examiner—James E. Bryant, III
Attorney, Agent, or Firm—Nixon & Vanderhye

[57] ABSTRACT

A flexible, impermeable textile fabric tube is coated with a first polymeric layer which is opaque and to which is applied a second polymeric layer containing metal particles, preferably of good thermal reflectivity. The second layer is clear, or at least translucent, in the absence of metal particles.

17 Claims, 1 Drawing Sheet

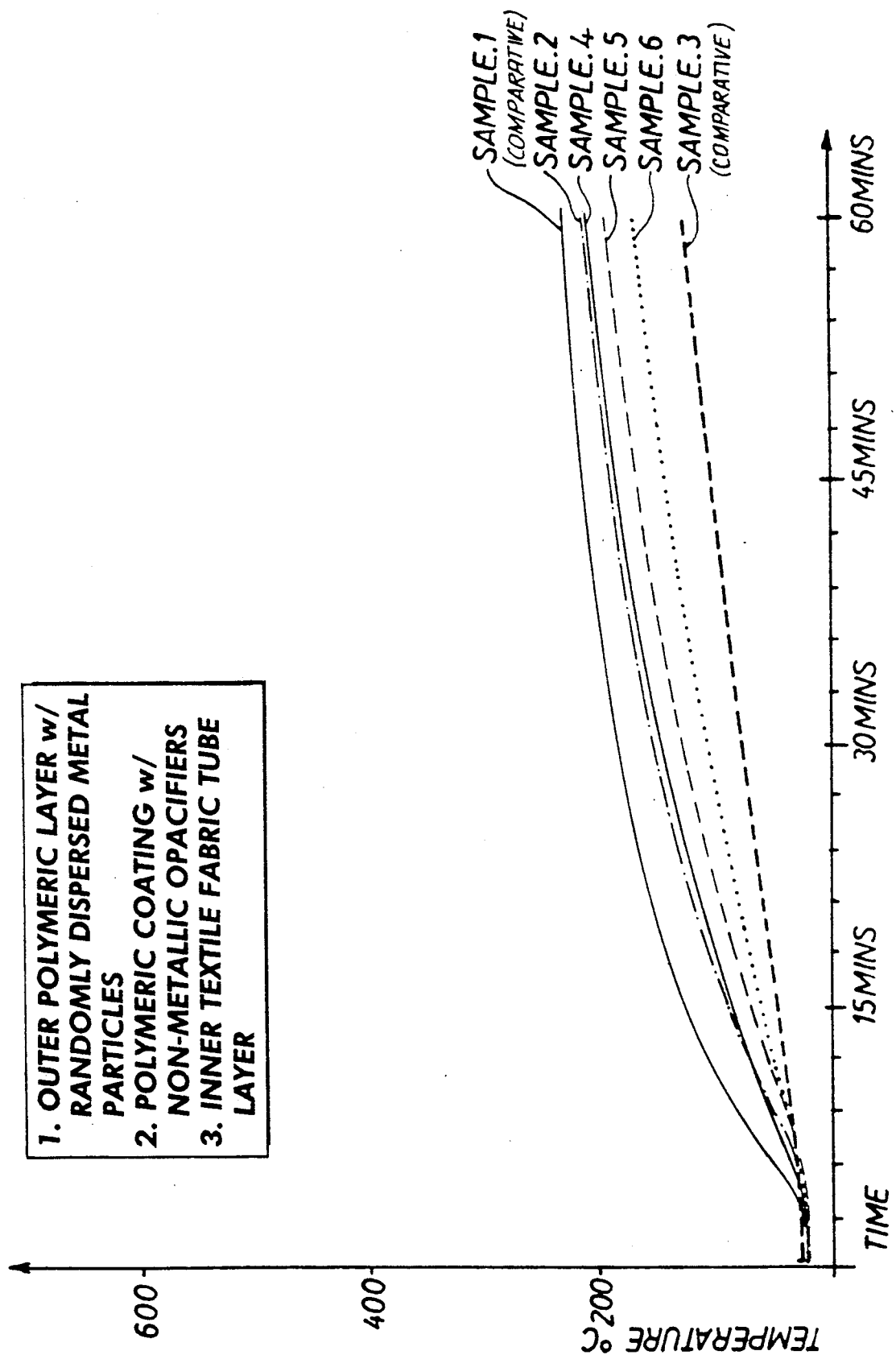

RADIANT HEAT RESISTANT FLEXIBLE TUBE

This invention relates to flexible tubes useful amongst other things for the protection of fuel pipes and electrical cables.

There are numerous occasions when it is desirable to protect fuel pipes and/or electrical cables against the effects of heat and vibration. For example, protective ducting is commonly made from a laminate of paper and aluminium foil, the laminate being thereafter formed into a corrugated or bellows-type tube. However, such tubing is vulnerable to tearing and/or to other mechanical damage.

U.S. Pat. No. 3,652,375 discloses a rigid glass fibre reinforced tube, in which the resin component of the tube is protected against degradation by ultraviolet light by the inclusion of reflective metallic powder. The powder is added to the outer, or surface layer of the tube. Such tubes are made by winding resin impregnated fabric tapes onto a heated mandel. Not only is the product rigid and therefore inconvenient to use in confined spaces, but also there are constraints on the minimum diameter of tube which is feasible.

Accordingly, it is usual to manufacture flexible tubing for such applications. One very widely used product is a flexible protective sleeving comprising a braided textile tube or sleeve impregnated with a flexible polymeric material to render it impermeable. Such tubes can be coated with metallic particles in the form of a paint containing dispersed metallic particles or flakes, typically of aluminium. Coatings of this kind are vulnerable to abrasion damage; they are also expensive. For this reason it has been proposed to compound metallic particles into the polymeric impregnant material itself, but this can in fact increase the heat transfer rate because the metal particles are uniformly distributed throughout the polymeric material.

The objective is to increase the resistance to the effects of radiant heat. The latter, predominantly in the form of infra-red energy, is a much greater problem than ultraviolet degradation, in many practical enviroments such as automotive engine compartments.

It is an object of the present invention to provide an improved tube of this type.

According to the present invention, an impermeable flexible tube comprising a textile fabric tube layer impregnated with a flexible polymeric material, and an outer, reinforcement-free layer of the same or a different flexible polymeric material, is characterised in that the polymeric material used to impregnate the fabric tube layer is compounded to be opaque and that the polymeric material of the outer layer is clear or at least translucent, and contains metal particles. The metal is preferable selected to exhibit good thermal, infra-red reflectivity; aluminium is particularly preferred.

The basic textile sleeve may be knitted or braided from almost any fibre which is commonly used for such applications where good thermal properties are desirable. For example glass fibres, ceramic fibres, aramid fibres, graphite fibres and asbestos fibres or blends of these with other fibres may be used.

A particularly preferred polymeric material is a curable acrylic resin composition, although polyurethane and silicone elastomers may also be used. The first coating layer does not include any metal particles, although other conventional colouring/compounding ingredients must be present to render it sensibly opaque. The second or outer layer which includes the metal particles is compounded from a clear or translucent (in the absence of metal particles) resin composition. Particularly preferred resins include acrylics, polyurethanes and silicone elastomers. A high degree of clarity/translucency has been found important in enhancing the thermal, (infra-red) reflectivity of the outer layer.

The method of manufacture is conventional. For example, the textile sleeve may be drawn through a container filled with a liquid acrylic or silicone rubber polymer composition containing pigments/opacifying agents. The coated textile sleeve may then be pulled through a forming die to ensure uniformity of the coating thickness. After a preliminary curing of the first layer, the coated textile sleeve can be passed through another container filled with a clear or translucent polymer composition containing metal particles. After passage through a forming die, the coated product can be oven cured in the usual way.

The final product thus has two layers, one containing pigments/opacifying agents and an outer layer containing metal particles. The latter are most conveniently in the form of powder or flakes, for example of aluminium and even if randomly dispersed, there will be gaps between them. Aluminium flakes are typically 13–18$\mu$ in size and as their exact alignment in the layer cannot be precisely controlled, some infra-red radiation can pass between them. However, the pigments/opacifying agents in the inner layer will be much smaller than metal particles, typically 0.1–4$\mu$ in size and accordingly, most of the infra-red radiation which passes between the metal flakes in the outer layer will be stopped by the pigment/opacifying agent(s) of the inner layer.

In order that the invention be better understood, it will now be described further with reference to the accompanying graph.

A number of sample protective tubes were tested by exposing them to an infra-red heater at a temperature of 540° C. spaced approximately 55 mm from the tube sample under test. A rubber hose was inserted into each sample in turn and the temperature inside the rubber hose was measured over a period of one hour.

Sample 1 shows the effect of heat on the unprotected rubber hose alone. It will be seen that the temperature rose rapidly towards 200° C. Sample 2 illustrates the results obtained when using a commercial sleeving of braided glass fibres covered with a single acrylic polymer layer containing aluminium powder. Sample 4 shows the results obtained when using a glass fibre braided textile sleeve coated with a single layer of a pigmented silicone rubber. In both cases there was an obvious but slight improvement over the unprotected hose alone. Sample 5 shows the effect of adding a second coating layer of pigmented silicone rubber containing aluminium powder to the sample used in test 4. Sample 6 shows the results obtained using a second coating layer of a clear acrylic polymer containing aluminium powder. Finally sample 3 shows the results obtained using a conventional textile braid completely wrapped with aluminium foil.

The aluminium powder was in each case about 10% by weight of the second coating, which appeared to be optimum for the material used.

It will be seen that sample 6 was a significant improvement on sample 5, thereby demonstrating the benefit of using a clear or at least translucent polymer for the outer, metallic particle - containing layer.

Although none of the products was quite as good as a braid wrapped with aluminium foil, the latter product was much less easy to make and much more fragile. Also, it was not impermeable.

We claim:

1. An impermeable flexible tube for protecting electrical cables from radiant heat comprising:

an inner textile fabric tube layer coated with a flexible polymeric material to achieve at least external surface impregnation of said inner textile fabric tube layer; and an outer, reinforcement-free layer of a flexible polymeric material, wherein the polymeric material used to coat the inner textile fabric layer contains non-metallic opacifiers, and the polymeric material of the outer layer is at least translucent and contains randomly dispersed reflective metal particles defining a first means to reflect radiant heat in which some radiant heat may pass between said metal particles, and said non-metallic opacifiers defining a second means to stop radiant heat passing said first means and thereby minimize radiant heat transfer to the electrical cables.

2. The impermeable flexible tube according to claim 1 wherein said polymeric material of said outer layer is a curable acrylic, polyurethane or silicone resin composition.

3. The impermeable flexible tube according to claim 1 wherein said metal particles are in the form of flakes having sizes of about 13–18μ.

4. The impermeable flexible tube according to claim 1 wherein said opacifiers have sizes of about 0.1–4μ.

5. The impermeable flexible tube according to claim 3 wherein said opacifiers have sizes of about 0.1–4μ.

6. The impermeable flexible tube according to claim 1 wherein said metal particles comprise about 10% by weight of said outer layer.

7. A tube according to claim 1 in that said metal particles are aluminium.

8. A tube according to claim 1 wherein said polymeric material of said inner layer coating is a curable acrylic, polyurethane or silicone resin composition.

9. A tube according to claim 1 wherein the fabric tube is knitted or braided from glass fibres, ceramic fibres, graphite fibres or asbestos fibres, or blends of these with other fibres/filaments.

10. An impermeable flexible tube construction for protecting electrical cables from radiant heat comprising:

(a) an inner textile fabric tube layer;

(b) first means comprising a flexible polymeric coating which is at least translucent and which contains randomly dispersed metal particles for reflecting only a portion of radiant heat to which said tube is exposed and permitting a remaining portion of radiant heat to pass through said first means;

(c) second means for stopping said remaining portion of radiant heat which penetrates said tube beyond said first means;

wherein said second means overlies said inner textile fabric tube layer, and said first means overlies said second means.

11. An impermeable flexible tube according to claim 10 wherein said metal particles are aluminum.

12. An impermeable flexible tube according to claim 11 wherein said second means comprises a flexible polymeric coating containing non-metallic opacifiers.

13. An impermeable flexible tube according to claim 10 wherein said flexible polymeric coating of said first means comprises a curable acrylic, polyurethane or silicone resin composition.

14. The impermeable flexible tube according to claim 10 wherein said metal particles are in the form of flakes having sizes of about 13–18μ.

15. The impermeable flexible tube according to claim 10 wherein said non-metallic opacifiers have sizes of about 0.1–4μ.

16. The impermeable flexible tube according to claim 10 wherein said metal particles comprise about 10% by weight of said outer layer.

17. A tube according to claim 10 wherein the fabric tube is knitted or braided from glass fibres, or blends of these with other fibres/filaments.

* * * * *